United States Patent
Manohar et al.

(10) Patent No.: US 11,812,749 B2
(45) Date of Patent: Nov. 14, 2023

(54) COMPOSITE COMPRISING TITANIUM DIOXIDE AND POLYANILINE

(71) Applicant: The University of Massachusetts, Boston, MA (US)

(72) Inventors: Sanjeev K. Manohar, Lowell, MA (US); Carl Lawton, Lowell, MA (US); Lekha Papammagari, Lowell, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 149 days.

(21) Appl. No.: 17/320,883

(22) Filed: May 14, 2021

(65) Prior Publication Data
US 2021/0352904 A1 Nov. 18, 2021

Related U.S. Application Data

(60) Provisional application No. 63/024,605, filed on May 14, 2020.

(51) Int. Cl.
| | | |
|---|---|---|
| *A01N 59/00* | (2006.01) | |
| *A01N 25/08* | (2006.01) | |
| *A01N 25/26* | (2006.01) | |
| *C09D 179/02* | (2006.01) | |

(52) U.S. Cl.
CPC ............ *A01N 59/00* (2013.01); *A01N 25/08* (2013.01); *A01N 25/26* (2013.01); *C09D 179/02* (2013.01)

(58) Field of Classification Search
CPC ........ A01N 59/00; A01N 25/08; A01N 25/26; C09D 179/02
See application file for complete search history.

(56) References Cited

U.S. PATENT DOCUMENTS

2004/0197300 A1* 10/2004 Nonami ................. A61L 9/01 424/78.09

FOREIGN PATENT DOCUMENTS

CN 107497182 A * 12/2017 ......... B01D 39/1623

OTHER PUBLICATIONS

Machine translation of CN 107497182 A from EPO. (Year: 2022).*
Papmmagari et al., "Enhanced Photocatalytic Activity of Polyaniline-Titanium dioxide Nanocomposites," Department of Chemical Engineering, University of Mass. Lowell, ACS Presentation Apr. 15, 2019.
Rokovic et al., "Poly(ortho-ethoxyaniline) in corrosion protection of stainless Steel," Corrosion Science 49 (2007), pp. 2567-2580.
Sarmah et al., "Photocatalytic activity of polyaniline-TiO2 nanocomposites," Indian J. Phys., vol. 85, No. 5, pp. 713-726, May 2011.
Wen et al., "The feasibility of polyaniline-TiO2 coatings for photocathodic antifouling: antibacterial effect," Synthetic Metals 257 (2019) 116175. 6 pages.
Yang et al., "Enhanced photocatalytic activity of PANI/TiO2 due to their photosensitization-synergetic effect," Electrochimica Acta 247 (2017), pp. 486-495.

* cited by examiner

*Primary Examiner* — Michael P Cohen
(74) *Attorney, Agent, or Firm* — CANTOR COLBURN LLP

(57) ABSTRACT

In an aspect, a method of making a composite comprises mixing titanium dioxide in a aqueous solution comprising an acid to form a titanium dioxide mixture; mixing an aniline monomer and an oxidizing agent with the titanium dioxide mixture to form a reaction mixture; and polymerizing the aniline monomer to form the composite comprising polyaniline and the titanium dioxide; wherein the titanium dioxide has an average particle size of 0.5 to 100 nm; and wherein the acid is free of a ($C_{8+}$ alkyl) benzene sulfonic acid or a derivative thereof. In another aspect, a composite comprises a plurality of titanium dioxide having an average particle size of 0.5 to 100 nm; a polyaniline; at least one of hydrochloric acid or 2-acryamido-2-propanesulfonic acid or a derivative thereof; wherein the composite is free of a ($C_{8+}$ alkyl) benzene sulfonic acid or a derivative thereof.

17 Claims, 6 Drawing Sheets

COMPOSITE COMPRISING TITANIUM DIOXIDE AND POLYANILINE

CROSS-REFERENCE TO RELATED APPLICATION

This application claims the benefit of U.S. Provisional Patent Application Ser. No. 63/024,605 filed May 14, 2020. The related application is incorporated herein in its entirety by reference.

BACKGROUND

There is an unmet need for a safe and cost-effective technologies for decontamination of air or surfaces. For example, the market size of antibacterial coatings alone is anticipated to reach $18.8 billion by 2027, registering a CAGR of 12.8% over the forecast period. Existing coatings for high touch surfaces are expensive and typically made from Ag, Cu, ZnO nanoparticles. Improved materials for decontamination are needed.

BRIEF SUMMARY

Disclosed herein is a composite comprising titanium dioxide and polyaniline.

In an aspect, a method of making a composite comprises mixing titanium dioxide in an aqueous solution comprising an acid to form a titanium dioxide mixture; mixing an aniline monomer and an oxidizing agent with the titanium dioxide mixture to form a reaction mixture; and polymerizing the aniline monomer to form the composite comprising polyaniline and the titanium dioxide; wherein the titanium dioxide has an average particle size of 0.5 to 100 nm; and wherein the acid is free of a ($C_{8+}$ alkyl) benzene sulfonic acid or a derivative thereof.

In another aspect, a composite comprises a plurality of titanium dioxide having an average particle size of 0.5 to 100 nm; a polyaniline; at least one of hydrochloric acid or 2-acryamido-2-propanesulfonic acid or a derivative thereof; wherein the composite is free of a ($C_{8+}$ alkyl) benzene sulfonic acid or a derivative thereof.

In yet another aspect, an article comprises the composite.

The above described and other features are exemplified by the following figures, detailed description, and claims.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
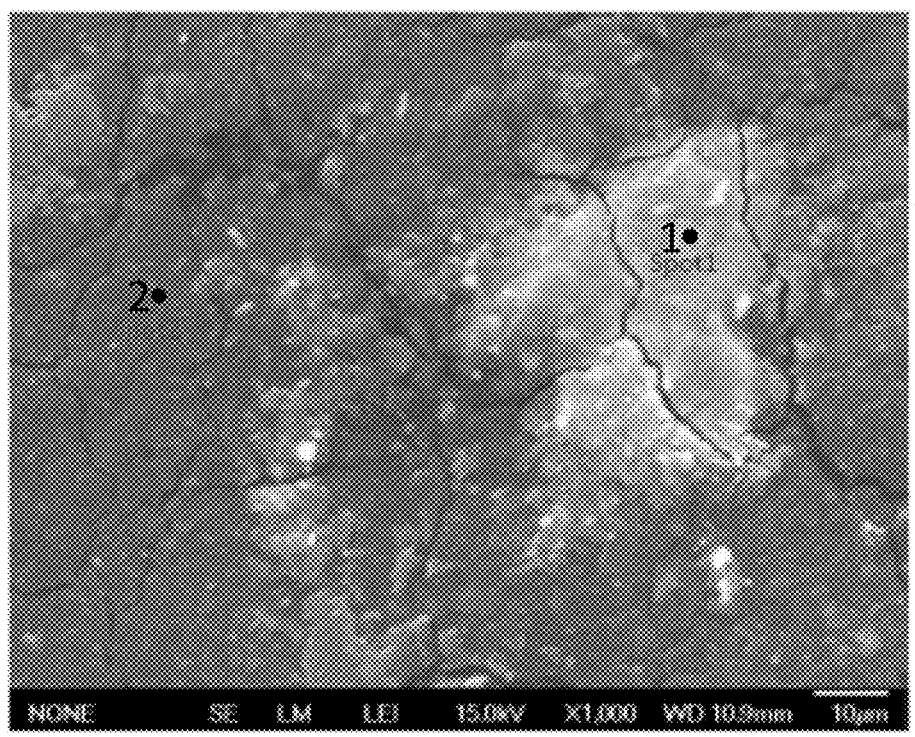
FIG. 1 is a scanning electron microscopy (SEM) image of the film formed in Example 2.

A simple, safe, and cost-effective coating technology was developed that has excellent antibacterial properties and can also decrease indoor air pollution. The technology enhances the ability of $TiO_2$ nanoparticles to photocatalytically oxidize organic matter while simultaneously mitigating potential safety issues related to nanoparticles. This technology is realized by coating $TiO_2$ nanoparticles with a thin layer of a conducting polymer, whose electronic properties enable $TiO_2$ nanoparticles to function even under normal fluorescent light. Preliminary in vitro tests show that the $TiO_2$/conducting polymer nanocomposite coatings can destroy 70% of bacterial colonies in 15 minutes and greater than 98% of bacterial colonies in 2 hours, and coatings of the same can reduce indoor air pollution by 90% in 45 minutes.

A method of making the composite can comprise mixing titanium dioxide in an aqueous solution comprising an acid to form a titanium dioxide mixture; mixing an aniline monomer and an oxidizing agent with the titanium dioxide mixture to form a reaction mixture; and polymerizing the aniline monomer to form the composite comprising polyaniline and the titanium dioxide. The acid can comprise at least one of HCl, $H_2SO_4$, $H_3PO_4$, $HNO_3$, $HClO_4$, $HBF_4$, an organic sulfonic acids (for example, a ($C_{1-7}$ aliphatic or aromatic) sulfonic acid (for example, 2-acryamido-2-propanesulfonic acid)), a Lewis acid (for example, a dialkylsulfate), or a transition metal based Lewis acid (for example, $CuCl_2$ or $AuCl_3$). The acid can be free of a ($C_{8+}$ alkyl) benzene sulfonic acid or a derivative thereof. Specifically, the composite can be free of, for example, comprising 0 to less than 0.5 weight percent of a ($C_{8+}$ alkyl) benzene sulfonic acid such a dodecyl benzene sulfonic acid based on the total weight of the composite. Without intending to be bound by theory, it is believed that the presence of the ($C_{8+}$ alkyl) benzene sulfonic acid disadvantageously adsorbs onto the titanium dioxide, providing long hydrophobic tails on the particles.

The oxidizing agent can comprise at least one of ammonium persulfate potassium permanganate, ferric chloride, potassium dichromate, potassium iodate, hydrogen peroxide catalyzed by a transition metal, hydrogen peroxide catalyzed by an enzyme, or hydrogen peroxide at a high ionic strength. A molar ratio of aniline to the oxidizing agent can be 1:0.2 to 1:2; or 1.2:1 to 1:1.2.

The aniline monomer and the oxidizing agent can be added as separate solutions each independently comprising an acid to the titanium dioxide mixture, where the acid can comprise at least one of HCl, $H_2SO_4$, $H_3PO_4$, $HNO_3$, $HClO_4$, $HBF_4$, an organic sulfonic acids (for example, a ($C_{1-7}$ aliphatic or aromatic) sulfonic acid (for example, 2-acryamido-2-propanesulfonic acid)), a Lewis acid (for example, a dialkylsulfate), or a transition metal based Lewis acid (for example, $CuCl_2$ or $AuCl_3$). A molar ratio of the titanium dioxide to the aniline monomer can be 0.1:1 to 1:1, or 0.5:1 to 1:1. The aniline monomer can be mixed with the titanium dioxide mixture prior to adding the oxidant. The oxidant can be added dropwise to the solution, for example, over a time of 15 minutes to 1 hour, or 25 to 45 minutes to facilitate polymerization of the polyaniline. The polymerizing can occur at a reduced temperature, for example, of less than or equal to 5 degrees Celsius (° C.), or −5 to 5° C. This temperature can be maintained using an ice bath, a cooling chamber, or the like. The polymerizing can occur for 2 to 6 hours, or 3 to 4 hours. The polymerizing can occur under acidic conditions, for example, at a pH of 0.1 to 5, or 0.1 to for by maintaining a concentration of hydrochloric acid of 0.5 to 2.5 Molar (M), or 0.9 to 1.3 M. Maintaining acidic reaction conditions can help to prevent or reduce the amount of over oxidized polyaniline containing phenazine linkages that can occur when the polyaniline is polymerized under less acidic conditions.

After polymerization of the polyaniline, a second monomer can be added to form a polyaniline copolymer. The second monomer can comprise at least one of a nitrogen or a ring-substituted aniline derivative, pyrrole, 3,4-ethylenedioxythiophene, furan, or thiophene, wherein second monomer can optionally comprise a pendant R group. For example, the second monomer, for example but not limited to, pyrrole, thiophene, or furan can comprise a pendant R group located on a carbon atom of five-member ring. The R group can comprise at least one of a proton acceptor group, a proton donor group, an electron acceptor group, an electron donor group, or a short chain C1-7 carbon containing chain. The R group can comprise at least one of a carboxylic acid group, an amino acid residue, or a peptide sequence. The copolymerization can include monitoring the open circuit potential of the reaction solution. Monitoring the potential can include adding a working electrode (for example, a platinum foil) and a reference electrode (for example, a saturated calomel electrode) to the solution and adding the second monomer when potential has reached a value of less than or equal to 0.75 Volts.

After the polymerizing, a powder can be isolated and filtered the composite from the polymerization mixture. The powder can be washed with at least one of a hydrochloric acid solution or acetone, or alternating washes of hydrochloric acid solution and acetone to thoroughly rinse the powder. Rinsing with one or both of hydrochloric acid solution and acetone can remove excess monomer, oligomer, or oxidant adhering to the titanium dioxide. The powder can be used as is or can be coated on a substrate, for example, by spray coating, dip coating, or the like.

Before or during the polymerizing, a substrate can be added to the reaction mixture. Adding such a substrate can result in a coating being formed on at least a portion of the surface of the substrate in contact with the reaction mixture. The coated substrate can be washed with at least one of a hydrochloric acid solution or acetone, or alternating washes of hydrochloric acid solution and acetone to thoroughly rinse the powder. Rinsing with one or both of hydrochloric acid solution and acetone can remove excess monomer, oligomer, or oxidant adhering to the titanium dioxide.

The substrate is not limited and can comprise at least one of a metal, a wood, a glass, a fabric, a rubber, a thermoplastic, or a thermoset. The substrate can comprise a fibrous mat, for example, natural or synthetic fibers. The fibrous mat can comprise at least one of polystyrene fibers, polyester fibers (for example, poly(ethylene terephthalate), or fluoropolymer fibers (for example, poly(vinylidene fluoride)).

A composite can comprise the plurality of titanium dioxide, the polyaniline, and at least one of hydrochloric acid or 2-acryamido-2-propanesulfonic acid or a derivative thereof. The composite can be free of a ($C_{6-20}$ alkyl) benzene sulfonic acid or derivative thereof.

The titanium dioxide can have an average particle size of 0.5 to 100 nanometers, or 15 to 25 nanometers. The particle size can be measured using dynamic light scattering. The titanium dioxide can have a narrow particle size distribution. For example, the polydispersity (PdI) status can be addressed by the intensity-weighted hydrodynamic average diameter (z-average) and PdI, which reflect the broadness of the size distribution (scale range from 0 to 1, with 0 being monodisperse and 1 being polydisperse). The polydispersity index of titanium dioxide can be 0.05 to 0.6. For polymerizing using titanium dioxide, for example, the polydispersity status can be 0.153±0.014. The composite can comprise 5 to 60 weight percent, or 20 to 50 weight percent, or 30 to 45 weight percent of the titanium dioxide based on the total weight of the composite.

The polyaniline can comprise at least one of a homopolymer of aniline or a copolymer of aniline and a second monomer. The polyaniline can have a weight average molecular weight of 50 to 100 kilodaltons (kDa), or 60 to 80 kDa based on polystyrene standards as measuring using GPC. If present, the second monomer can comprise repeat units derived from at least one of monomer comprising at least one of pyrrole, 3,4-ethylenedioxythiophene, or thiophene. The polyaniline copolymer can have a molar ratio of repeat units derived from aniline to repeat units derived from the second monomer of 1:0 to 1:1, or 1.0:0.2. The composite can comprise 40 to 95 weight percent, or 50 to 80 weight percent, or 55 to 70 weight percent of the polyaniline based on the total weight of the composite. The composite can comprise 40 to 94 weight percent, or 50 to 79 weight percent, or 55 to 69 weight percent of the polyaniline based on the total weight of the composite.

A composition can comprise the composite. For example, the composition can be a paint. An article can comprise the composite comprising the plurality of titanium dioxide, the polyaniline, and at least one of hydrochloric acid or 2-acryamido-2-propanesulfonic acid or a derivative thereof and that is free of the ($C_{6-20}$ alkyl) benzene sulfonic acid or derivative thereof. The article can be an air filter. The article is not limited and can be a glove (for example, a rubber glove or a fabric glove), a carpet, a curtain, an upholstery fabric, a reusable bag, or a hospital gown. The article can be a personal protection equipment (PPE), for example, a glove, face shield, google, a gown, a shoe, a shoe covering, or a hair covering.

The article can have antibacterial properties, for example, preventing or reducing bacterial growth thereon as compared to a same article but without the composite. This improvement in antibacterial properties can be measured by diluting bacterial to $10^4$ colony-forming units per milliliter (CFU/mL) in a volume of 5 milliliters (mL); exposing the article with and without the $TiO_2$-polyaniline composite; inducing photocatalysis of the bacterial using lab hood lights, removing 100 microliter aliquots of the media with time, culturing the aliquots in LB Agar Petri dishes, and counting the colonies forming after 24 hours at 37° C.

The following examples are provided to illustrate the present disclosure. The examples are merely illustrative and are not intended to limit devices made in accordance with the disclosure to the materials, conditions, or process parameters set forth therein.

EXAMPLES

The materials described in Table 1 were used in the examples.

| Material | Description | Supplier |
|---|---|---|
| TiO₂ | Titanium dioxide powder. Particles having an average particle size of 25 nanometers measured using DLS | SigmaAldrich, DegussaP25 |
| Aniline | Aminobenzene, liquid, 99%. ACS Reagent | Sigma Aldrich |
| HCl | Hydrochloric acid, liquid, 37% in water. 1M aqueous solution of hydrochloric acid made by diluting concentrated HCl (37%) | Alfa Aesar |
| AMPSA | 2-acryamido-2-propanesulfonic acid powder, 99%. 1M solution made by diluting in DI water | Sigma Aldrich |
| APS | Ammonium peroxydisulfate powder, 98%, $(NH_4)_2S_2O_8$ | Sigma Aldrich |

In the examples, Fourier Transform Infrared (FTIR) spectroscopy was performed by attenuated total reflection (ATR)/Fourier transform infrared (FTIR) using a Thermo Scientific Nicolet iS50 Fourier transform infrared spectrometer.

Scanning electron microscopy (SEM) images with energy dispersive X-ray spectroscopy (EDS) were obtained using a FESEM-JEOL-JSM7401F with polymer dispersed on conductive carbon tape.

UV/Vis spectroscopy was performed using a PerkinElmer Lambda 25 Spectrophotometer.

Example 1

Formation of TiO₂-Polyaniline Composite Powder

Aniline (1 milliliter (mL), 10.95 millimoles (mmol)) was dissolved in a magnetically stirred solution of aqueous 1M HCl (90 mL) at room temperature in a 300 mL flask. Titanium dioxide powder (0.5 grams (g)) was added all at once and the reaction vessel was cooled to about 5 degrees Celsius (° C.) using an ice bath. The mixture was stirred for about 45 minutes (min) to ensure complete dispersion of the TiO₂ powder. A solution of the oxidizing agent was prepared by dissolving ammonium persulfate (2.5 g, 10.95 mmol) in aqueous 1M HCl (100 mL) in a 140 mL flask that was also cooled to about 5° C. using an ice bath.

The solution of ammonium persulfate was added to the aniline solution drop wise, via a burette, over a period of about 30 min while maintaining a temperature of less than about 5° C. During the addition of the oxidant, the colorless reaction mixture gradually turned light blue and became opaque after about 15 min, signaling the onset of the reaction. The dark blue/green precipitate of hydrochloride-doped polyaniline/TiO₂ formed continuously over the course of the reaction (3.5 hours). The reaction mixture was suction filtered in air and washed successively with aqueous HCl (10×20 mL), and acetone (10×20 mL) to remove any adhering aniline and oxidant. The acetone washings were initially dark-blue/violet which gradually turned colorless over successive washings signaling removal of any adhering soluble colored impurities. The resulting dark green hydrochloride-doped polyaniline/TiO₂ powder was dried in an air oven at 60° C. for 5 hours.

Example 2

Formation of TiO₂-Polyaniline Film

Aniline (1 mL, 10.95 mmol) was dissolved in a magnetically stirred solution of aqueous 1M HCl (90 mL) at room temperature in a 300 mL flask. Titanium dioxide powder (0.5 g) was added all at once and the reaction vessel. A substrate of butyl rubber (2 centimeters (cm)×2 cm) was dropped into the solution and the reaction flask that was cooled to about 5° C. using an ice bath. The mixture was stirred for about 45 min to ensure complete dispersion of the TiO₂ powder and to give sufficient time for aniline monomer to deposit on the surface of the butyl rubber.

A solution of the oxidizing agent was prepared by dissolving ammonium persulfate (2.5 g, 10.95 mmol) in aqueous 1M HCl (100 mL) in a 140 mL flask that was also cooled to about 5° C. using an ice bath. The solution of $(NH_4)_2S_2O_8$ was added to the aniline solution drop wise, via a burette, over a period of about 30 min while ensuring that the temperature did not rise above about 5° C. During the addition of oxidant, the colorless reaction mixture gradually turned light blue signaling the onset of the reaction and became opaque after about 15 min signaling formation of polyaniline A dark blue/green precipitate of hydrochloride-doped polyaniline/TiO₂ formed continuously over the course of the reaction (3.5 h) and a corresponding polymer film also deposited spontaneously during the reaction on the surface of the butyl rubber by in situ adsorption polymerization. The butyl rubber sample was removed from the reaction mixture and washed successively with aqueous HCl (5×10 mL), and acetone (5×10 mL) to remove any adhering aniline and oxidant. A strongly adhering, dark-blue/violet coating of hydrochloride-doped polyaniline/TiO₂ was observed on the surface of butyl rubber. The sample was dried in an air oven at 21° C. for 12 hours.

Figure 2:
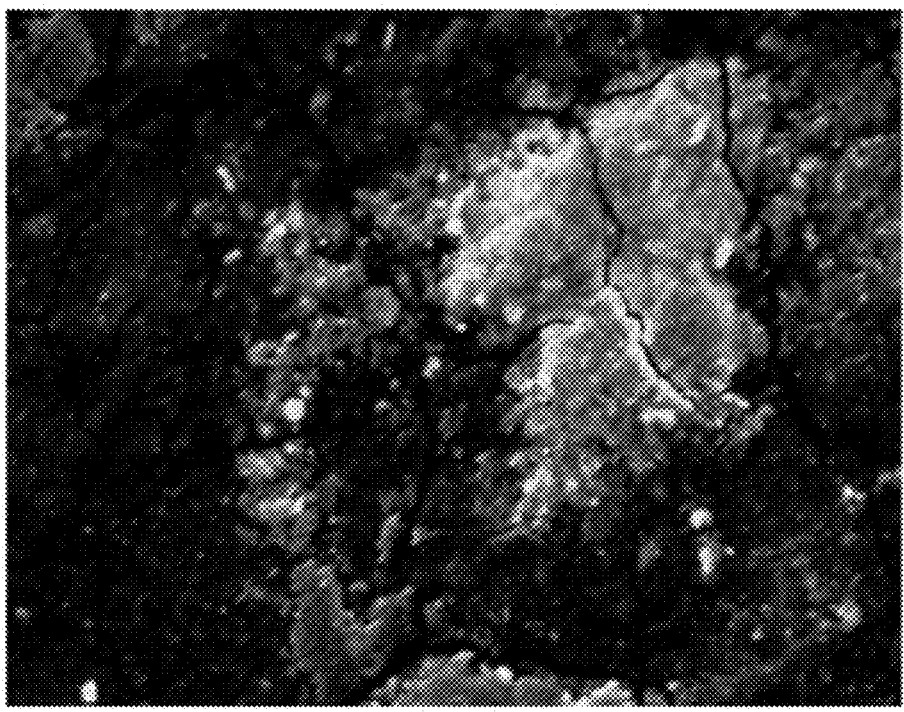
FIG. 2 is an energy dispersive X-ray spectroscopy (EDS) image disposed on the SEM image of FIG. 1.
Figure 3:
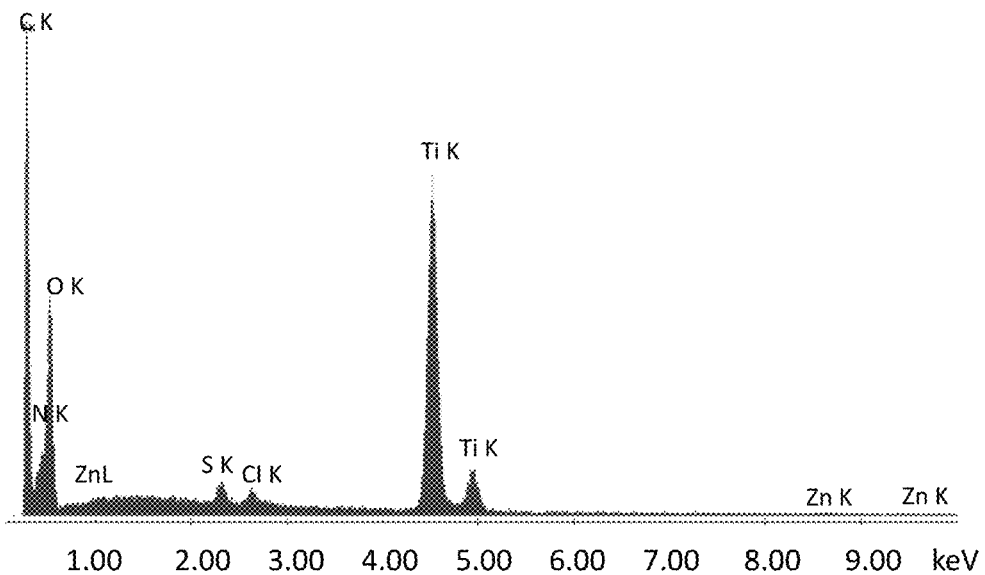
FIG. 3 is a graphical illustration of the EDS data taken from a Spot 1 of Example 2.
Figure 4:
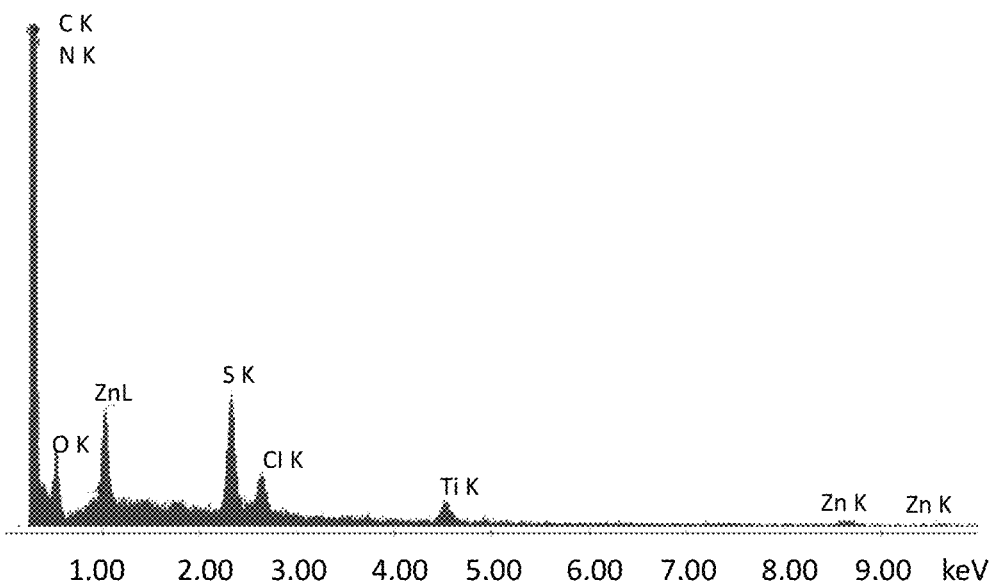
FIG. 4 is a graphical illustration of the EDS data taken from a Spot 2 of Example 2.

SEM images and EDS analysis of the coated rubber were taken and the results are shown in FIG. 1 and FIG. 2, respectively. The lighter areas in FIG. 1 show that TiO₂ has deposited on the surface. FIG. 2 confirms this conclusion where the spots in the lighter areas indicate EDS analysis that positively identified titanium on the surface. The graphical output of the EDS analysis of Spots 1 and 2 as identified in FIG. 1 are shown in FIG. 3 and FIG. 4, respectively. FIG. 3 and FIG. 4 show that the presence of titanium in Spot 1 (FIG. 3) is much greater than in Spot 2 (FIG. 4) though it is clear that there is at least some titanium successfully deposited in Spot 2 as well (Ti K). FIG. 3 and FIG. 4 also illustrate that both polyaniline and the hydrochloric acid dopant are present on the surface with presence of the nitrogen peaks (N K) and the chloride peaks (Cl K).

Example 3

Formation of AMPSA-Doped TiO₂-Polyaniline Powders and Coatings

Aniline (2 mL, 21.9 mmol) was dissolved in a magnetically stirred solution of 1M AMPSA (30 mL) at room temperature in a 150 mL flask. Titanium dioxide powder (0.5 g) was added all at once and the reaction vessel. A piece of butyl rubber (2 cm×2 cm) was dropped into the solution. The mixture was stirred for about 45 min to ensure complete dispersion of the TiO₂ powder and to provide sufficient time for at least some of the aniline monomer to deposit on the surface of the butyl rubber.

A solution of the oxidizing agent was prepared by dissolving ammonium persulfate (1.15 g, 5 mmol) in 1M aqueous AMPSA (20 mL) in a 50 mL flask. The solution of ammonium persulfate was added to the aniline solution drop wise, via a burette, over a period of about 30 min while ensuring that the temperature did not rise above about 5° C. During the addition of oxidant, the colorless reaction mixture gradually turned light blue signaling the onset of the reaction and became opaque after about 15 min signaling formation of polyaniline A dark blue/green precipitate of AMPSA-doped polyaniline/$TiO_2$ forms continuously over the course of the reaction (3.5 hours) and a corresponding polymer film deposited spontaneously during the reaction on the surface of the butyl rubber by in situ adsorption polymerization. The butyl rubber sample is removed from the reaction mixture and washed successively with aqueous 1M AMPSA (5×10 mL), and acetone (5×10 mL) to remove any adhering aniline and oxidant. A strongly adhering, dark-blue/violet coating of AMPSA-doped polyaniline/$TiO_2$ can be seen on the surface of butyl rubber. The sample was dried in an air oven at 21° C. for 12 hours.

Figure 5:
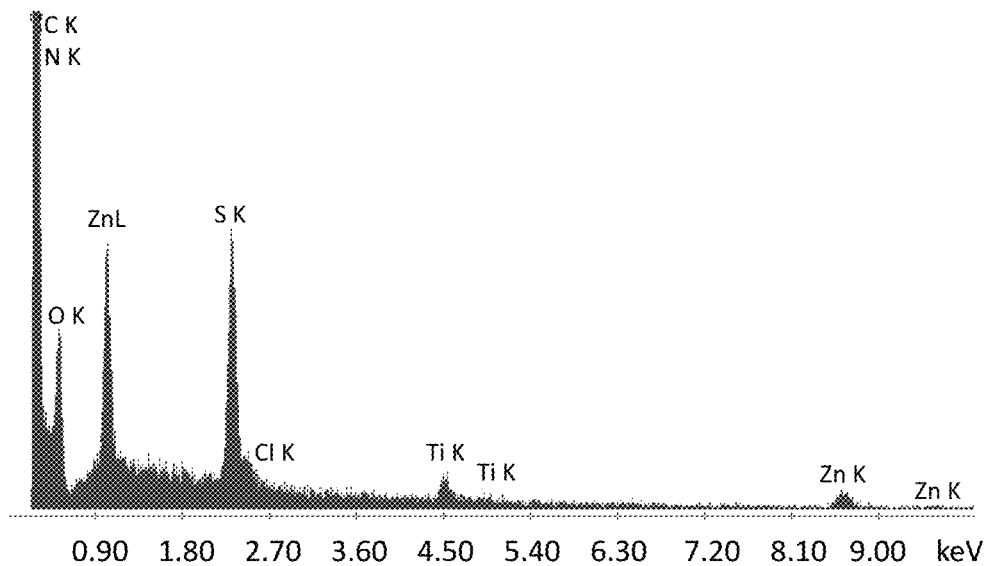
FIG. 5 is a graphical illustration of the EDS data taken from a spot of the coated surface of Example 3.

EDS analysis of the coated rubber were taken and the graphical output of the EDS analysis of a spot on the surface of the coated rubber is shown in FIG. 5. FIG. 5 shows that the presence of titanium peak (Ti K), the polyaniline with presence of the nitrogen peak (N K), and the AMPSA with the large Sulfur peak (S K).

Example 4

Formation of a Block Copolymer of $TiO_2$-Polyaniline-Polypyrrole

Aniline (2 mL, 21.95 mol) was dissolved in a magnetically stirred solution of aqueous 1M HCl (30 mL) at room temperature in a 140 mL flask. Commercially available DegussaP25 titanium dioxide powder (0.5 g) was added all at once and the reaction vessel. A variety of substrates can be added at this stage. For instance, a piece of butyl rubber (2 cm×2 cm) can be dropped into the solution and the reaction flask was cooled to about 5° C. using an ice bath. The mixture was stirred for about 45 min to ensure complete dispersion of the $TiO_2$ powder and to provide sufficient time for aniline monomer to deposit on the surface of the butyl rubber. A solution of the oxidizing agent was prepared by dissolving ammonium persulfate (7.15 g, 31.3 mmol) in aqueous 1M HCl (20 mL) in a 50 mL flask that was cooled to about 5° C. using an ice bath.

The reaction flask containing aniline solution was set up for potential time profiling using Pt foil as the working electrode and saturated calomel electrode (SCE) as the reference. The solution of ammonium persulfate was added all at once to the aniline solution and the potential was monitored continuously over time Immediately upon addition of ammonium persulfate the potential rises from 0.2 volts (V) to 0.62 V. The potential then gradually increased over a period of 10 min to 0.76 V and began to drop. When the potential reached 0.75 V pyrrole monomer (2 mL, 28.8 mmol) was added all at once into the reaction flask. The potential dropped rapidly over a period of 0.5 min to 0.4 V and then to 0.07V over a period of 20 min. This is consistent with the oxidative polymerization of pyrrole to polypyrrole by polyaniline in the pernigraniline oxidation state. In this step, pernigraniline was reduced to emeraldine and the new polypyrrole chains were attached to the terminal amino group of emeraldine (block co-polymer).

The black precipitate of hydrochloride-doped polyaniline-co-polypyrrole/$TiO_2$ formed continuously over the course of the reaction (1 hour). The reaction mixture was suction filtered in air and washed successively with aqueous HCl (10×20 mL), and acetone (10×20 mL) to remove any adhering aniline, pyrrole, and ammonium persulfate. The acetone washings were initially dark-blue/violet which gradually turned colorless over successive washings signaling removal of any adhering soluble colored impurities. The resulting black hydrochloride-doped polyaniline-co-polypyrrole/$TiO_2$ powder was dried in an air oven at 60° C. for 5 h.

A black precipitate of hydrochloride-doped polyaniline-co-polypyrrole/$TiO_2$ formed continuously over the course of the reaction (1 h) and a corresponding polymer film also deposited spontaneously during the reaction on the surface of the butyl rubber by in situ adsorption polymerization. The butyl rubber sample was removed from the reaction mixture and washed successively with aqueous 1M HCl (5×10 mL), and acetone (5×10 mL) to remove any adhering aniline, pyrrole, and ammonium persulfate. A strongly adhering, black colored coating of hydrochloride-doped polyaniline-co-polypyrrole/$TiO_2$ can be seen on the surface of butyl rubber. The sample was dried in an air oven at 21° C. for 12 hours.

Example 5

Antibacterial Properties of $TiO_2$-Polyaniline Composites

*Pseudomonas putida* was diluted in $10^4$ CFU/mL in a volume of 5 mL and exposed to 2 mL aqueous dispersions of PANI, $TiO_2$, PANI-$TiO_2$ at 0.01 gram per milliliter. To test the antibacterial activity in the visible range, photocatalysis was induced by the lab hood lights. Aliquots of 100 microliters were collected from each sample at 0, 15, 30, 45 and 60 min, respectively, and plated in LB Agar Petri dishes. The Petri dishes were incubated overnight at 37° C. Colony forming units, CFU, were counted after 24 hours.

Figure 6:
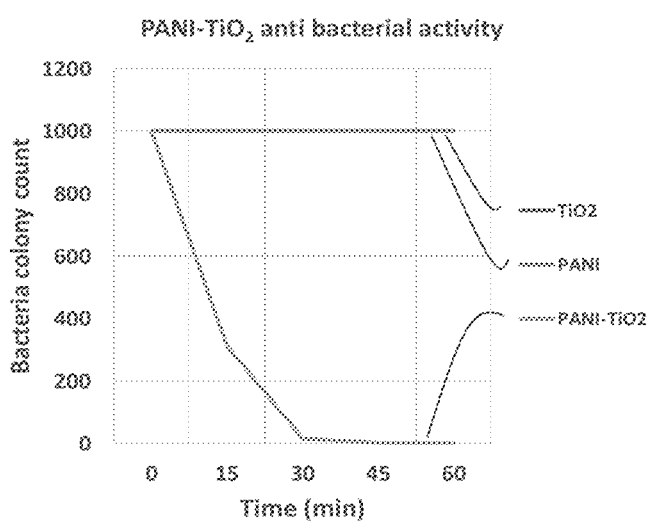
FIG. 6 is a graphical illustration of the bacterial reduction with time of Example 5.

The results, as shown in FIG. 6, show that a 70% kill efficiency was achieved with the addition of the $TiO_2$-polyaniline composite powder and that all of the bacteria was killed by about 40 minutes. These results are surprising as neither the pure titanium dioxide nor the polyaniline was shown to have an effect on the number of bacteria.

The antibacterial properties of the $TiO_2$-polyaniline composites were further tested by coating polyaniline onto butyl acrylate rubber substrates in accordance with Example 2 and Example 4. *E. coli* bacteria were diluted up to $10^3$ CFU/mL in a volume of 10 mL in a petri dish and exposed to rubber substrates coated with polyaniline, $TiO_2$-polyaniline, $TiO_2$-polyaniline-polypyrrole. To test the antibacterial activity in the visible range, photocatalysis was induced by the lab hood lights. Aliquots of 100 milliliters were collected from each sample after 2 hours and plated in LB Agar Petri dishes. Plates were incubated overnight at 37° C. Colony forming units, CFU, were counted after 24 hours.

Figure 7:
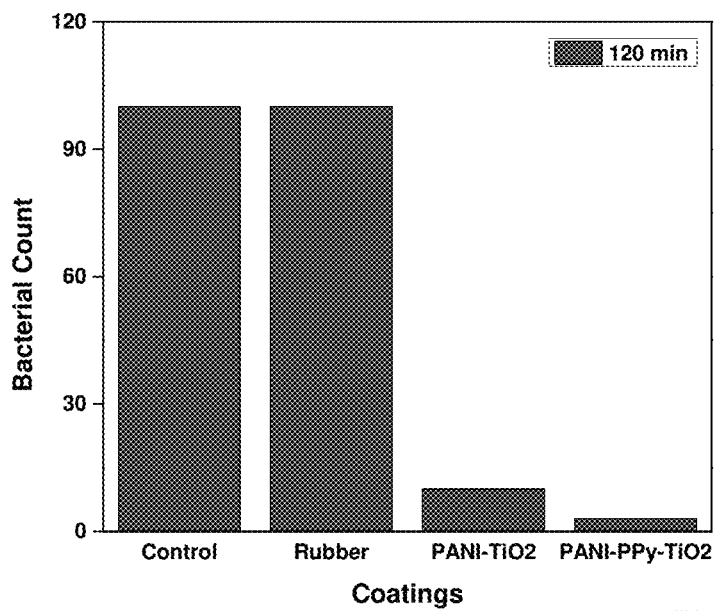
FIG. 7 is a graphical illustration of the bacterial reduction with time of Example 5.

FIG. 7 illustrates that after about 2 hours of being in contact with the coated films, nearly all of the *E. coli* died, where the block copolymer composite film exhibited a bacteria kill rate about 98% against *E. coli* in 2 h. This data was compared to a control sample where no rubber was added and a control sample where an uncoated rubber was added.

Example 6

Photodegradation of Methylene Blue Dye

Methylene blue was used to monitor the photocatalytic degradation over the $TiO_2$-polyaniline composite powder. Specifically, 3.5 mL of 5 parts per million by weight (ppm) methylene blue and 1 mL aqueous NaOH into a test tube resulting in a solution with a pH of about 11. To this solution 5 milligrams of $TiO_2$-polyaniline composite powder of Example 1 was added into the tube. The samples were exposed to conventional fluorescent lab laboratory lights and periodically 0.2 mL aliquots extracted every five minutes using a syringe. A syringe filter was then attached to syringe containing the aliquot and the contents were injected into a curette that was used to measure optical absorption of the dye using electronic absorption spectroscopy (UV/vis).

Figure 8:
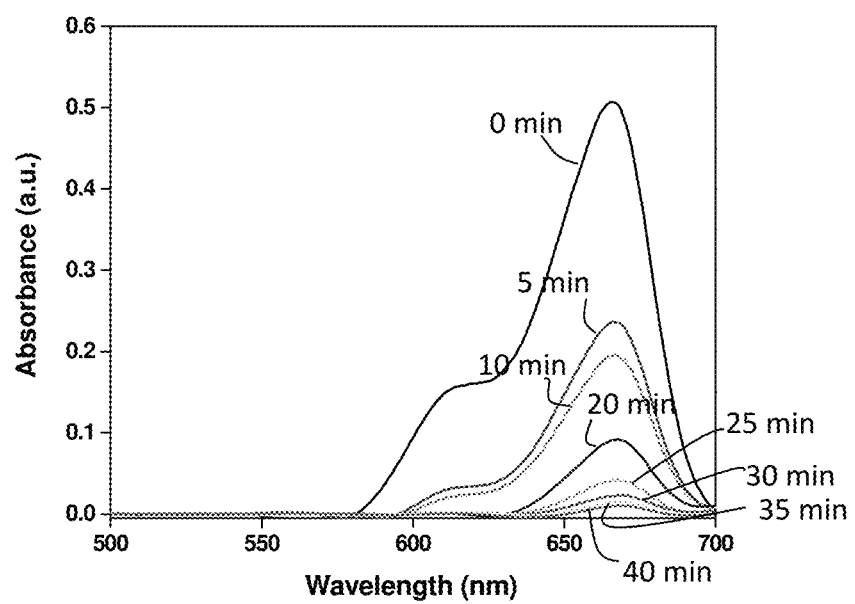
FIG. 8 is a graphical illustration of the Ultraviolet (UV)/Visible light spectra of Example 6

UV/Visible light spectra were taken and are illustrated in FIG. 8. FIG. 8 shows that there is a 94% photodegradation of 5 ppm methylene blue dye in the presence of polyaniline-$TiO_2$ (PANI-$TiO_2$) in 45 min.

Example 7

Electrochemical Studies of the $TiO_2$-Polyaniline Composite Films and Powder A film or powder coated on a Pt foil that was immersed in a beaker containing 100 mL aqueous 1.0 M HCl equipped with a Pt mesh counter electrode and saturated calomel reference electrode. The 3-electrode system was connected to the electrochemical workstation, and all measurements are recorded electronically. The open circuit potential ($V_{oc}$) values of emeraldine salts were recorded first. Before taking a complete scan (−0.1 volts (V) to 0.9 V), the electrodes were first preconditioned by continuously cycling back and forth between −0.1 V and 0.4 V for at least ten scans, or as long as peaks in subsequent scans overlapped with each other showing there was no drift in the redox peaks. After preconditioning, the electrode was cycled back and forth between −0.1 V and 0.9 V for one cycle, constituting the final cyclic voltammogram profile.

Figure 9:
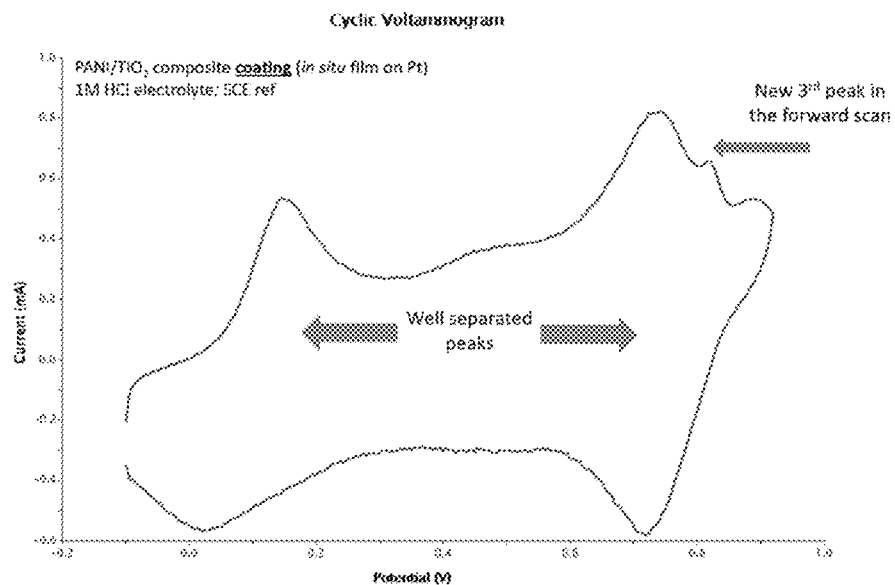
FIG. 9 is a graphical illustration of the current versus potential for the composite coating of Example 7.
Figure 10:
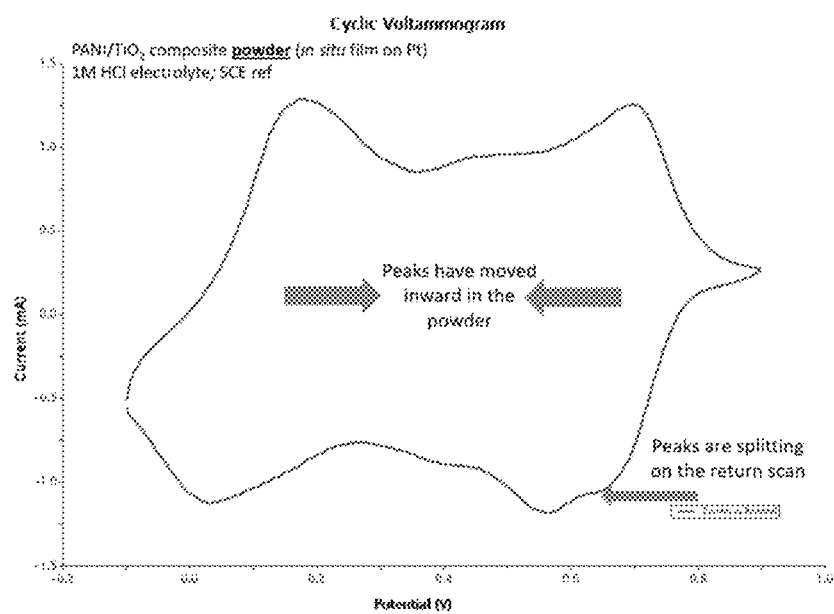
FIG. 10 is a graphical illustration of the current versus potential for the composite powder of Example 7.

Graphical illustrations of the current versus potential for the composite film and the powder are shown in FIG. 9 and FIG. 10, respectively. FIG. 9 show the emergence of a "3rd peak" in the cyclic voltammogram. In contrast, the bulk powder does not display this 3rd peak. There is also a significant inward shift of the two main peaks illustrating that the powder is compositionally different from the film coating the substrate.

Example 8

Effect of the $TiO_2$-Polyaniline Composites on Air Purification

Air purification studies were performed by coating Whatman™ filter paper with the $TiO_2$-polyaniline composite powder of Example 1 using a UVP light source having a wavelength of 254 nanometers. A dispersion was prepared by sonicating 0.1 g $TiO_2$-polyaniline powder in 5 mL acetone for five minutes. The dispersion was pipetted in small portions directly on a 7 cm diameter Whatman filter paper making sure that the acetone evaporated completely before each addition. For the chamber testing, a Temtop™ LKC-1000S+ air quality monitor was used to measure the air quality, including formaldehyde levels, volatile organic chemicals (VOCs), and particle count. The initial air quality level was first recorded in the chamber with the filter inside. The chamber was made up of acrylic sheets with total dimension of 18 inches×12 inches×12 inches. A UVP ultraviolet light was used to activate the filter during testing with UV light. The short wave length UV light with 254 nm was used for better efficiency. After placement of the filter paper, an incense stick was lit for 10 minutes in order to fill the air inside the chamber with a certain amount of smoke. The air quality variables were then recorded as the time elapsed to measure the reduction in volatile organics in the chamber. To measure formaldehyde and VOC levels, all measurements were based on milligrams per meter cubed ($mg/m^3$). The measurement of the particulate matter (PM2.5) was based on micrograms per meter cubed ($\mu g/m^3$).

Figure 11:
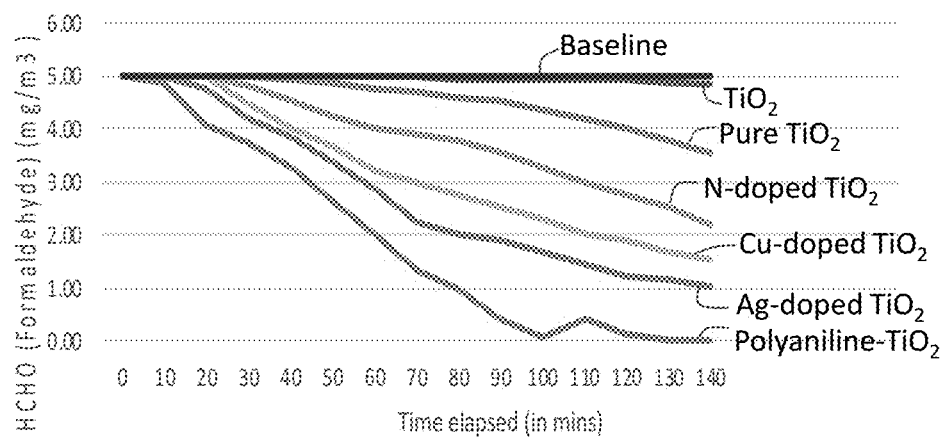
FIG. 11 is a graphical illustration of the formaldehyde versus time elapsed of Example 8.
Figure 12:
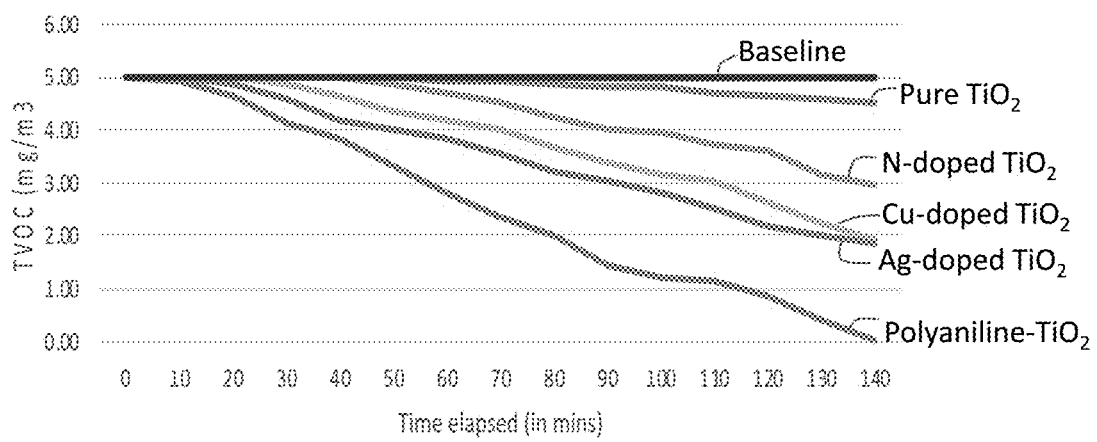
FIG. 12 is a graphical illustration of the VOC versus time elapsed of Example 8.

The level of formaldehyde and volatile organic compounds (VOCs) in the air were measured with time and the results are shown in FIG. 11 and FIG. 12, respectively. This data was compared to filter paper coated with various other $TiO_2$ compositions. Specifically, comparisons were made between as purchased commercial $TiO_2$, pure $TiO_2$ that was synthesized "pure $TiO_2$" powder using a sol gel method, and pure $TiO_2$ doped by other agents, for instance, by nitrogen, copper and silver (N-doped $TiO_2$, Cu-doped $TiO_2$, Ag-doped $TiO_2$). FIG. 11 and FIG. 12 both show that $TiO_2$-polyaniline composite powder were better at filtering out the formaldehyde and the total amount of VOCs (TVOC) from the air.

Set forth below are non-limiting aspects of the present disclosure.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

The terms "first," "second," and the like, as used herein do not denote any order, quantity, or importance, but rather are used to distinguish one element from another.

Unless defined otherwise, technical and scientific terms used herein have the same meaning as is commonly understood by one of skill in the art to which this disclosure belongs. Compounds are described using standard nomenclature.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composite comprising:
    a plurality of titanium dioxide particles having an average particle size of 0.5 to 100 nm;
    a polyaniline;
    at least one of hydrochloric acid or 2-acrylamido-2-propanesulfonic acid or a derivative thereof;
    wherein the composite is free of a ($C_{8+}$ alkyl) benzene sulfonic acid or a derivative thereof;
    wherein the composite is in the form of a powder or a film; and
    wherein the composite comprises 30 to 45 weight percent of the titanium dioxide particles based on the total weight of the composite.

2. The composite of claim 1, wherein the titanium dioxide particles have at least one of an average particle size of 15 to 25 nm or wherein a polydispersity index of the titanium dioxide is 0.05 to 0.6.

3. The composite of claim 1, wherein the composite comprises 5 to 60 weight percent of the titanium dioxide based on the total weight of the composite.

4. The composite of claim 1, wherein the composite is a powder.

5. The composite of claim 1, wherein the composite is a coating on a substrate.

6. The composite of claim 5, wherein the substrate is at least one of rubber, a thermoplastic, a thermoset, or a fabric.

7. The composite of claim 1, wherein the polyaniline comprises a polyaniline copolymer comprising repeat units derived from at least one of monomer comprises at least one of a nitrogen or a ring-substituted aniline derivative, pyrrole, 3,4-ethylenedioxythiophene, furan, or thiophene, wherein second monomer optionally comprises a pendant R group.

8. An article comprising the composite of claim 1.

9. The article claim 8, wherein the article has antibacterial properties and is an air filter, a carpet, a curtain, an upholstery fabric, a reusable bag, or a hospital gown, a glove, or personal protection equipment.

10. The composite of claim 1, wherein the composite comprises the 2-acrylamido-2-propanesulfonic acid or a derivative thereof.

11. A composite comprising:
    a plurality of titanium dioxide particles having an average particle size of 0.5 to 100 nm;
    a polyaniline;
    at least one of hydrochloric acid or 2-acryamido-2-propanesulfonic acid or a derivative thereof;
    wherein the composite is free of a (C8+ alkyl) benzene sulfonic acid or a derivative thereof;
    wherein the composite is in the form of a powder or a film;
    wherein the composite comprises 30 to 45 weight percent of the titanium dioxide particles based on the total weight of the composite; and
    wherein the combination of titanium dioxide and polyaniline produces a synergistic antimicrobial effect.

12. The method of claim 11, wherein the titanium dioxide has an average particle size of 15 to 25 nm and wherein a polydisperisty index of the titanium dioxide is 0.05 to 0.6.

13. The method of claim 11, wherein the oxidizing agent comprises at least one of ammonium persulfate, potassium permanganate, ferric chloride, potassium dichromate, potassium iodate, ammonium cerium nitrate, copper chloride, hypochlorous acid, benzoyl peroxide, or a hydrogen peroxide.

14. The method of claim 11, further comprising isolating the composite in the form of a powder, and optionally depositing the powder onto a substrate.

15. The method of claim 11, further comprising adding a substrate prior to or during the polymerizing to form a composite coating on at least one surface of the substrate.

16. The method of claim 11, further comprising polymerizing a second monomer on the polyaniline to form a block copolymer.

17. The method of claim 16, wherein the second monomer comprises at least one of a nitrogen or a ring-substituted aniline derivative, pyrrole, 3,4-ethylenedioxythiophene, furan, or thiophene, wherein second monomer optionally comprises a pendant R group.

* * * * *